United States Patent [19]
Fink et al.

[11] Patent Number: 5,158,162
[45] Date of Patent: Oct. 27, 1992

[54] TUBE VIBRATION DAMPENER AND STIFFENER APPARATUS AND METHOD

[75] Inventors: David J. Fink, Greentree; Stephen M. Ira, Plum Boro; Thomas M. Frick, North Huntingdon; James R. Ziler, Pittsburgh, all of Pa.

[73] Assignee: Westinghouse Electric Corp., Pittsburgh, Pa.

[21] Appl. No.: 407,598
[22] Filed: Sep. 15, 1989
[51] Int. Cl.⁵ .............................................. F16F 7/10
[52] U.S. Cl. ................................... 188/378; 188/381; 267/148
[58] Field of Search ............... 188/378, 379, 380, 373, 188/372, 371, 268, 382, 65.1, 381; 267/136, 182, 147, 204, 154, 155, 156, 273, 284, 285, 148, 149, 166, 169, 137

[56] References Cited

U.S. PATENT DOCUMENTS

| | | |
|---|---|---|
| 2,238,146 | 2/1940 | Yavitch . |
| 2,889,011 | 6/1959 | Weaver .............................. 188/381 |
| 2,960,189 | 11/1960 | Osburn . |
| 2,969,126 | 1/1961 | Gardner . |
| 2,969,416 | 1/1961 | McGavern . |
| 3,019,622 | 2/1962 | Fermier .......................... 267/154 X |
| 3,128,330 | 4/1964 | Grasser .......................... 188/378 X |
| 3,204,913 | 9/1965 | Lawrence et al. ............. 267/148 X |
| 3,351,307 | 11/1967 | Michel et al. .................. 267/148 X |
| 3,371,895 | 3/1968 | Speranza, Jr. ................. 267/148 X |
| 3,539,139 | 11/1970 | Eucker . |
| 3,553,345 | 1/1971 | Edwards ........................ 188/381 X |
| 3,559,512 | 2/1971 | Aggerwal . |
| 3,568,805 | 3/1971 | Reed, III ............................ 188/378 |
| 3,690,414 | 9/1972 | Aggerwal et al. . |
| 3,820,594 | 6/1974 | Ritland et al. . |
| 3,991,856 | 11/1976 | Shigeta et al. ................. 267/136 X |
| 4,050,665 | 9/1977 | Matthews et al. . |
| 4,211,308 | 7/1980 | Reuterskoild . |
| 4,350,233 | 9/1982 | Buckley ............................. 188/378 |
| 4,390,042 | 6/1983 | Kucherer et al. . |
| 4,519,519 | 5/1985 | Meuschke et al. . |
| 4,590,991 | 5/1986 | Cooper, Jr. et al. . |
| 4,591,136 | 5/1986 | Leonard ............................. 267/154 |
| 4,653,576 | 3/1987 | Lagally . |
| 4,678,620 | 7/1987 | Marshall et al. . |
| 4,706,788 | 11/1987 | Inman et al. . |
| 4,718,479 | 1/1988 | Lagally et al. . |
| 4,720,840 | 1/1988 | Lagally et al. . |
| 4,823,846 | 4/1989 | Everett et al. . |
| 5,000,430 | 3/1991 | Smith ............................ 267/148 X |

FOREIGN PATENT DOCUMENTS

| | | | |
|---|---|---|---|
| 0109815 | 2/1944 | U.S.S.R. .......................... 267/285 |
| 1059323 | 12/1983 | U.S.S.R. .......................... 188/378 |
| 1295076 | 3/1987 | U.S.S.R. .......................... 188/381 |
| 1298447 | 3/1987 | U.S.S.R. .......................... 188/381 |

OTHER PUBLICATIONS

Au-Yang, M. K., "Development of Stabilizers for Steam Generator Tube Repair", Nuclear Engineering and Design, 103, pp. 189-197 (1987).
Schofield, R. S., "Steam Generator Tube Staking At The San Onofre Nuclear Generator Station", Radiation Protection Management, pp. 68-72 (Jan., 1986).
Au-Yang, M. K., "Flow-Induced Vibration: Guidelines for Design, Diagnosis, and Troubleshooting of Common Power Plan Components", Transactions of the ASME, vol. 107 (Nov., 1985).
Paidoussis, M. P., "A Review of Flow-Induced Vibrations In Reactors and Reactor Components", Nuclear Engineering and Design, 74, pp. 31-60 (1982).
Jendraejczyk, J. A., and Chen, S. S., "Fluid Forces Acting On Circular Cylinders In Liquid Cross Flow", Components Technology Division, Argonne National Laboratory, Argonne, Ill.

Primary Examiner—Douglas C. Butler

[57] ABSTRACT

Vibration dampener and stiffener apparatus and method for increasing the dampening and the stiffness of a tube subjected to large amplitude flow-induced vibration. The preferred embodiment of the apparatus includes a plurality of flexible braided cables capable of being disposed in the tube for dissipating the vibration energy of the tube as the tube vibrates, the cables having a first end portion and a second end portion. Enclosing the first end portion of the plurality of flexible cables is a rigid cable tip member and enclosing the second end portion of each cable is a rigid cable end fitting. As the tube vibrates due to flow-induced vibration, the vibration energy will be transferred to the cables which will rub together creating frictional heat energy that will radiate from the cables. In this manner, the vibration amplitude of the tube is decreased. Moreover, as the tube vibrates, the rigid cable tip member and the rigid cable end fittings will tend to stiffen the tube.

8 Claims, 6 Drawing Sheets

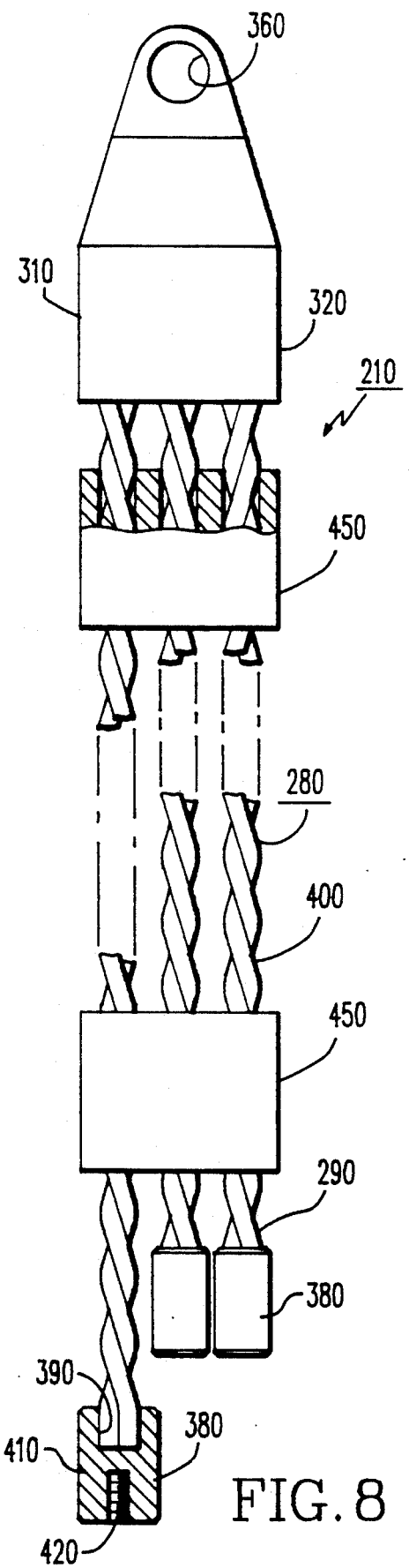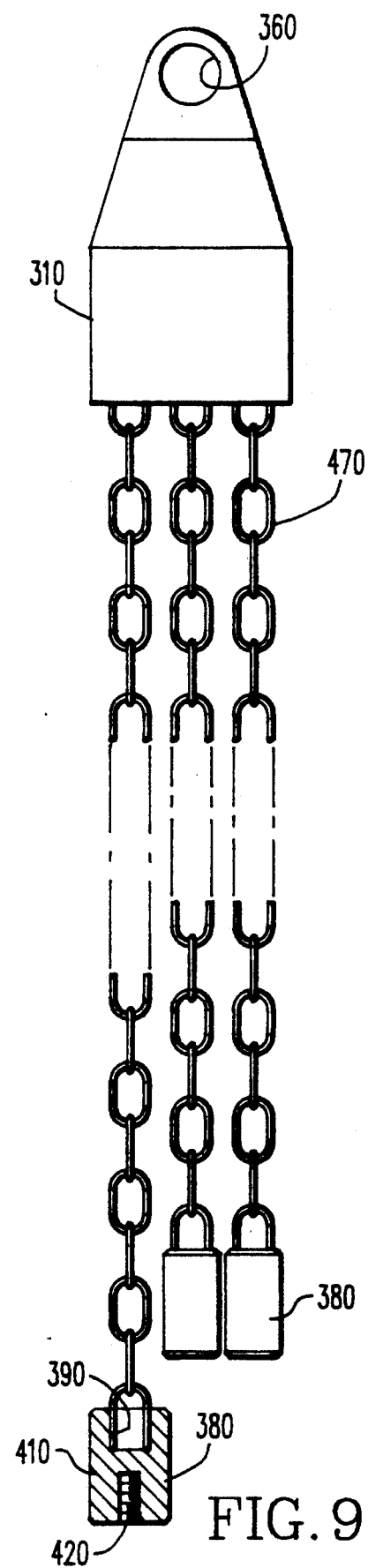

TUBE VIBRATION DAMPENER AND STIFFENER APPARATUS AND METHOD

This invention generally relates to attenuating the vibration of tubular members and more particularly relates to a tube vibration dampener and stiffener apparatus and method for increasing the dampening and the stiffness of a tube subjected to large amplitude flow-induced vibration.

Although devices and methods for attenuating flow-induced vibration of tubular members have met with some success, it has been observed that these devices and methods have a number of operational problems associated with them. However, before these problems can be appreciated, some background is necessary as to the definitions of the terms used hereinbelow and the mechanisms causing flow-induced vibration. In this regard, it is known that a structural component placed in the flow of a fluid or gas can be induced to oscillate or vibrate (i.e., to and from motion). The vibration will have a defined period, which is the time that elapses while the to an from motion repeats itself. The vibration will also have a defined cycle, which is the motion completed during the period. Moreover, the component will obtain a certain frequency of vibration, which is the number of completed cycles of motion per unit time. In general, it is believed that if the natural frequency (i.e., vibration frequency ignoring frictional losses) of the component is raised above the frequency of the induced vibration, the vibration of the component will lessen. Stiffening (e.g., adding rigid members) the component raises the natural frequency of the component and merely adding mass to the component lowers the natural frequency of the component. Associated with each frequency of vibration is a mode of vibration, which is defined as the shape of the to and from motion. During the vibration, the mode of vibration of the vibrating component will pass through an equilibrium position which is the position at which the component is under two equal and opposing forces and is in static equilibrium. Of course, the amplitude of vibration is the numerical value of the maximum displacement to either side of the equilibrium position. The effect of reducing the vibration amplitude of the component is known as damping which can be caused by a dampening device or by frictional forces or by both a dampening device and friction.

The vibration of the component disposed in the flow field is generally referred to in the art as flow-induced vibration. In the case of cross flow across an array of tubes (e.g., a steam generator tube bundle) the mechanisms of turbulent buffeting, vortex shedding and fluidelastic instability may operate to cause flow-induced vibration. In the case of vortex shedding, periodic shedding of vortices may cause relatively large amplitude oscillations if the system damping is small. Vortex shedding may be suppressed or reduced by devices such as helical stakes or a perforated shroud. However, if such devices are not practical in a particular field environment, then it may be necessary to increase the damping so as to reduce the vibration amplitude. In addition to vortex shedding, a tube in cross flow is also subjected to turbulent buffeting, which occurs at all flow velocities, due to the random pressure perturbations of turbulent eddies acting on the tubular surface. In addition to vortex shedding and turbulent buffeting forces, the tube may experience fluidelastic instability which is the rapid increase in tube vibration amplitude once a certain critical cross flow velocity is exceeded. Fluidelastic instability is typically viewed as the most serious and damaging phenomenon with which to contend.

With particular reference to a nuclear reactor heat exchanger or steam generator, the heat exchanger or steam generator generates steam when heat is transferred through heat conductors from a radioactive primary fluid to a non-radioactive secondary fluid. The primary fluid flows at high velocity through a plurality of tubes (i.e., a tube bundle) as the secondary fluid flows at high velocity along and across the exterior surfaces of the tubes which are disposed in the steam generator. The walls of the tubes function as the heat conductors for conducting heat from the primary fluid flowing through the tubes to the secondary fluid flowing along and across the exterior surfaces of the tubes.

Because the primary fluid flowing in the steam generator tubes is radioactive, the steam generator is designed such that the radioactive primary fluid does not radioactively contaminate the nonradioactive secondary fluid by commingling with the secondary fluid. It is therefore desirable that the tubes remain leak-tight so that the radioactive primary fluid remains separated from the nonradioactive secondary fluid to avoid commingling the primary fluid with the secondary fluid.

Occasionally, due to flow-induced vibration caused by the high velocities of the fluids and due to tube wall intergranular cracking caused by stress and corrosion during operation, the steam generator tubes may degrade (i.e., tube wall thinning) and develop surface and volume flaws and thus may not remain leak-tight. Thus, the tubes may become degraded by vibration-caused fretting wear and cyclic fatigue as well as by corrosion attack. If through-wall cracking occurs due to the flaws or degradation, the radioactive primary fluid may commingle with the nonradioactive secondary fluid. Hence, steam generator tubes are typically non-destructively inspected to determine if any tubes have flaws. If flaws are indicated, the suspect tube is removed from service such as by plugging the open ends of the degraded tube. On the other hand, the tube, although degraded, may remain in service by sleeving the degraded portion of the tube. In either case, the radioactive primary fluid is prevented from commingling with the non-radioactive secondary fluid even though the wall of the tube is degraded.

However, when the steam generator is returned to service after tube plugging or sleeving, the flawed or degraded tube will continue to experience flow-induced vibration due to the velocity of the fluid flowing along and across the exterior surfaces of the tubes during operation of the steam generator. Such vibration may propagate or accelerate the degradation and hence may increase the risk that the degraded plugged or sleeved tube will sever and damage neighboring tubes, thereby commingling radioactive primary fluid with non-radioactive secondary fluid. It is therefore desirable that the vibration of the degraded sleeved or plugged tube be attenuated.

Thus, energy absorbed by the tubes from impingement of the secondary fluid along and across the exterior surfaces of the plugged or sleeved tubes can excite the tubes to vibrate at some natural frequency and relatively large related amplitude. This vibration can result in relatively large amplitude dependent bending stresses developing in the tubes. Hence, for conditions where the energy extracted by the tubes from the fluid is equal to or greater than the damping energy of the tubes, the tubes can become unstable and relatively large vibration amplitudes can result. These relatively large amplitudes, that can be caused for example by fluidelastic excitation, can generate sufficient levels of bending stress to enhance the initiation and the propagation of the degradation through the wall of the tube, which degradation eventually may cause the tube to sever. The severed unsupported tube end is then free to impact against and damage adjacent tubes.

In the case of a nuclear power plant steam generator, the flow-induced vibration mechanisms recited hereinabove have safety and economic significance. As stated hereinabove, it is remotely possible that a plugged or sleeved degraded tube will sever due to the flow-induced vibration. Thus, if this were to occur, the degraded tube or portion thereof may swirl in the flowing fluid field and impact neighboring undamaged tubes in the tube bundle with force sufficient to damage these neighboring tubes in which primary fluid is still flowing. The walls of these neighboring tubes may thereby become breached allowing the radioactive primary fluid to radioactively contaminate the non-radioactive secondary fluid. Contamination of the secondary fluid will cause radioactive contamination of normally uncontaminated secondary system components. This is undesirable from a safety standpoint and is to be avoided. Therefore, it is important to reduce the relatively large vibration amplitude of the degraded tube and to stiffen the tube so that the degraded tube does not sever to possibly compromise the safety of the power plant.

In terms of economics, if the degraded tube damages neighboring tubes, the steam generator may have to be taken out of service and repaired. Taking the steam generator out of service entails shutting-down the nuclear reactor. When the nuclear reactor is shut-down, replacement power will typically be purchased by the electric utility operating the nuclear power plant in order to replace the power that otherwise would have been generated by the nuclear power plant. Replacement power may cost the electric utility approximately $300,000 each day the reactor is shut-down in addition to the expenses required to repair or replace the steam generator. Therefore, it is important to reduce the economic risk that the steam generator will be taken out of service due to a tube severed by relatively large vibration amplitudes.

Consequently, from both a safety and an economic standpoint, it is desirable to reduce the vibration of the degraded tube even though the tube is plugged or sleeved. Consequently, a problem in the art is to reduce the relatively large vibration amplitude of the tube and to stiffen the tube so that the tube does not sever when subjected to flow-induced vibration.

A stabilizer device and method for reducing vibration in a tube in a heat exchanger is disclosed by U.S. Pat. No. 4,590,991 issued May 27, 1986 in the name of Frank W. Cooper, Jr. et al. entitled "Flexible Stabilizer For Degraded Heat Exchanger Tubing" and assigned to the Westinghouse Electric Corporation. The Cooper, Jr. et al. device is a flexible vibration stabilizer and method for reducing vibration in a degraded tube. The flexible member may carry a plurality of rigid members thereon to provide nominal clearance between the flexible member and the adjacent tube wall. According to this patent, vibration is reduced by mechanical interaction between the flexible member or the rigid members and the adjacent tube wall. However, the Cooper, Jr. et al. patent does not appear to disclose a plurality of flexible members having a plurality of rigid members strategically placed at predetermined locations thereon for stiffening the tube. Moreover, the Cooper, Jr. et al. patent does not appear to disclose a plurality of flexible members disposed in the tube for reducing the amplitude of vibration of the tube by the mechanical interaction among the flexible and rigid members as well as by the mechanical interaction between the flexible members and the tube wall.

A nuclear power plant steam generator that is provided with expandable antivibration bars is disclosed by U.S. Pat. No. 4,653,576 issued Mar. 31, 1987 in the name of Hermann O. Lagally entitled "Expandable Antivibration Bar For a Steam Generator" and assigned to the Westinghouse Electric Corporation. According to this patent, the antivibration bars are positioned between columns of tubes in the steam generator and are attached to retaining rings surrounding the bundle of tubes. The antivibration bars eliminate clearance space between the tubes, thereby lessening the vibration of the tubes during operation of the steam generator. However, the Lagally patent does not appear to disclose a plurality of flexible and rigid members disposed inside a degraded tube for reducing large amplitude vibration of and for increasing the stiffness of the tube by the mechanical interaction among the flexible members as well as by the mechanical interaction between the flexible members and rigid members and the tube wall.

Hence, although the prior art discloses devices and methods for reducing vibration in tubular members, the prior art does not appear to disclose a tube vibration dampener and stiffener apparatus and method for increasing the dampening and the stiffness of a tube subjected to large amplitude flow-induced vibration.

Therefore, what is needed is a tube vibration dampener and stiffener apparatus and method for increasing the dampening and the stiffness of a tube subjected to large amplitude flow-induced vibration.

SUMMARY OF THE INVENTION

Disclosed herein are vibration dampener and stiffener apparatus and method for increasing the dampening and the stiffness of a tube subjected to large amplitude flow-induced vibration. Preferred embodiment of the apparatus includes a plurality of flexible braided cables capable of being disposed in the tube for absorbing the vibration energy of the tube as the tube vibrates, the cables having a first end portion and a second end portion. Enclosing the first end portion of the plurality of cables is a rigid cable tip member and enclosing the second end portion of each cable is a rigid cable end fitting. As the tube vibrates due to flow-induced vibration, the vibration energy will be transferred to the cables which will absorb the energy and then dissipate the energy as heat such that the vibration amplitude of the tube is decreased. Moreover, as the tube vibrates, the rigid cable tip member and the rigid cable end fittings will tend to stiffen the tube.

Therefore, an object of the invention is to provide an apparatus for attenuating the vibration of a tubular member as the tubular member vibrates, the apparatus comprising dampening means capable of being disposed in the tubular member for dampening the vibration of the tubular member, means attached to the dampening means for stiffening the tubular member, and means attached to the dampening means for registering the dampening means with the open end the tubular member and for slidably inserting the apparatus into the tubular member.

Another object of the invention is to provide a method for dampening large amplitude vibrations of a vibrating steam generator tube.

These and other objects the present invention will become apparent to those skilled in the art upon a reading of the following detailed description when taken in conjunction with the drawings wherein there is shown and described illustrative embodiment of the invention.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

FIG. 8 shows another embodiment of the invention, comprising the plurality of flexible cables having a plurality of spaced-apart sleeves disposed thereon; and FIG. 9 illustrates yet another embodiment of the invention comprising a plurality of chains.

DESCRIPTION OF THE PREFERRED EMBODIMENT(S)

In a nuclear power plant steam generator, it is important from a safety and economic standpoint to maintain the separation of the radioactive primary fluid from the non-radioactive secondary fluid so that the primary fluid does not commingle with the secondary fluid. Occasionally, due to flow-induced vibration of the steam generator tubes and due to intergranular stress corrosion cracking of the tubes, some of the tubes may degrade and thus may not remain leak-tight. Such tubes are typically plugged or sleeved. Although plugged or sleeved, there is some risk that the flow-induced vibration of the degraded tubes during continued operation of the steam generator may propagate or accelerate the degradation and eventually cause the degraded tube to sever. Such a severed tube may impact and damage adjacent non-degraded tubes and cause the radioactive primary fluid to commingle with the non-radioactive secondary fluid. It is therefore desirable to attenuate the flow-induced vibration of the degraded tube. Disclosed herein are an apparatus and a method for attenuating flow-induced vibration of tubular members.

Figure 1:
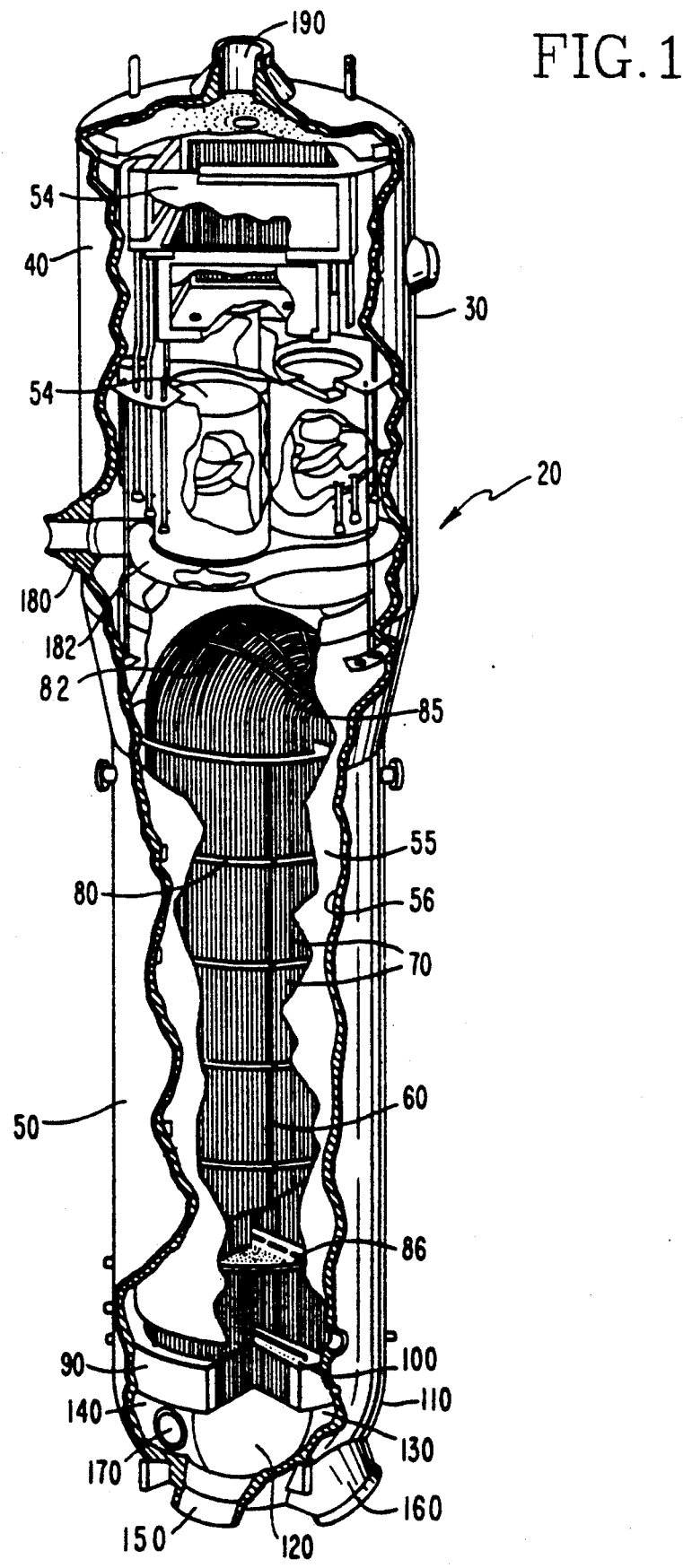
FIG. 1 shows in partial vertical section a nuclear power plant steam generator parts removed for clarity, the steam generator having plurality of tubes disposed therein.

Referring to FIG. 1, a nuclear power plant steam generator is referred to generally as 20 and comprises a generally cylindrical outer hull 30 having a cylindrical upper portion 40 and a cylindrical lower portion 50. Disposed in upper portion 40 is moisture separating means 54 for separating a steam-water mixture (not shown). Disposed in lower portion 50 is an inner hull 55 which is closed at its top end except for a plurality of openings in its top end for allowing passage of the steam-water mixture from inner hull 55 to moisture separating means 54. Inner hull 55 is open at its bottom end, which inner hull 55 and outer hull 30 define an annulus 56 therebetween. Disposed in inner hull 55 is a vertical steam generator tube bundle 60 having a plurality of vertical, inverted U-shaped steam generator tubes 70. Disposed at various locations along the length of bundle 60 are a plurality of horizontal, circular tube support plates 80 having holes therethrough for receiving each tube 70, for laterally supporting tubes 70 and for reducing flow-induced vibration in tubes 70. Additional support for tubes 70 is provided in a U-bend tube portion or region 82 of bundle 60 by a plurality of antivibration bars 85 for reducing flow-induced vibration in tubes 70.

As shown in FIG. 1, disposed in lower portion 50 and below a bottom-most support plate 86 is a horizontal, circular tube sheet 90 having a plurality of vertical apertures 100 therethrough for receiving the ends of tubes 70. Tube sheet 90 is sealingly attached around its circumferential edge to a hemispherical channel head 110. Disposed in channel head 110 is a vertical, semi-circular divider plate 120 sealingly attached to channel head 110 along the circumferential edge of divider plate 120 and sealingly attached to tube sheet 90 along the flat edge of divider plate 120. Divider plate 120 divides channel head 110 into an inlet plenum chamber 130 and an outlet plenum chamber 140.

Still referring to FIG. 1, disposed on outer hull 30 below tube sheet 90 are a first inlet nozzle 150 and a first outlet nozzle 160 in fluid communication with inlet plenum chamber 130 and with outlet plenum chamber 140, respectively. A plurality of manway holes 170 are formed through outer hull 30 below tube sheet 90 for providing access to inlet plenum chamber 130 and outlet plenum chamber 140. Formed through outer hull 30 above tube bundle 60 is a second inlet nozzle 180, which is connected to a perforated, horizontal and generally toroidal feedring 182 disposed in upper portion 40 for allowing entry of secondary fluid (not shown) into upper portion 40. The secondary fluid will flow through inlet nozzle 180, into upper portion 40 and through the perforations (not shown) of feedring 182. A second outlet nozzle 190 is disposed on the top of upper portion 40 for exit of steam from steam generator 20.

During operation of steam generator 20, primary fluid (not shown), such as water, enters inlet plenum chamber 130 through first inlet nozzle 150 and flows through tubes 70 to outlet plenum chamber 140 where the primary fluid exits steam generator 20 through first outlet nozzle 160. In a typical pressurized water reactor steam generator, the primary fluid, which may obtain a temperature of approximately 650 degrees Fahrenheit and a pressure of approximately 2250 pounds per square inch absolute (psia), may attain a velocity at tube sheet 90 of approximately 15 feet per second. Moreover, the primary fluid may attain a velocity of approximately 25 feet per second at the U-bend tube portion or region 82 of tube bundle 60. Such a relatively high velocity may tend to cause flow-induced vibration of tubes 70. The secondary fluid, such as water, enters feedring 182 through second inlet nozzle 180, which is in fluid communication with feedring 182, and flows downwardly from the perforations of feedring 182 through annulus 56 until the secondary fluid is in fluid communication with tube sheet 90. The secondary fluid then leaves annulus 56 flowing upwardly through bundle 60 where the secondary fluid boils and vaporizes into a steam-water mixture due &o conductive heat transfer from the primary fluid to the secondary fluid through the walls of tubes 70 which comprise bundle 60 and which function as heat conductors. The secondary fluid, which may obtain a temperature of approximately 540 degrees Fahrenheit and a pressure of approximately 1000 psia, may reach a cross-flow velocity across tube bundle 60 of approximately 25 feet per second and may cause flow-induced vibration in tubes 70. The steam-water mixture flows upwardly from bundle 60 and is separated by moisture separating means 54 into saturated water and dry saturated steam. Thus, as the secondary fluid enters feedring 182 through second inlet nozzle 180, dry saturated steam exits steam generator 20 through second outlet nozzle 190. Moreover, the primary fluid is radioactive; therefore, steam generator 20 is designed such that the primary fluid is nowhere in direct fluid communication with the secondary fluid in order that the secondary fluid is not radioactively contaminated by commingling with the radioactive primary fluid.

Figure 2:
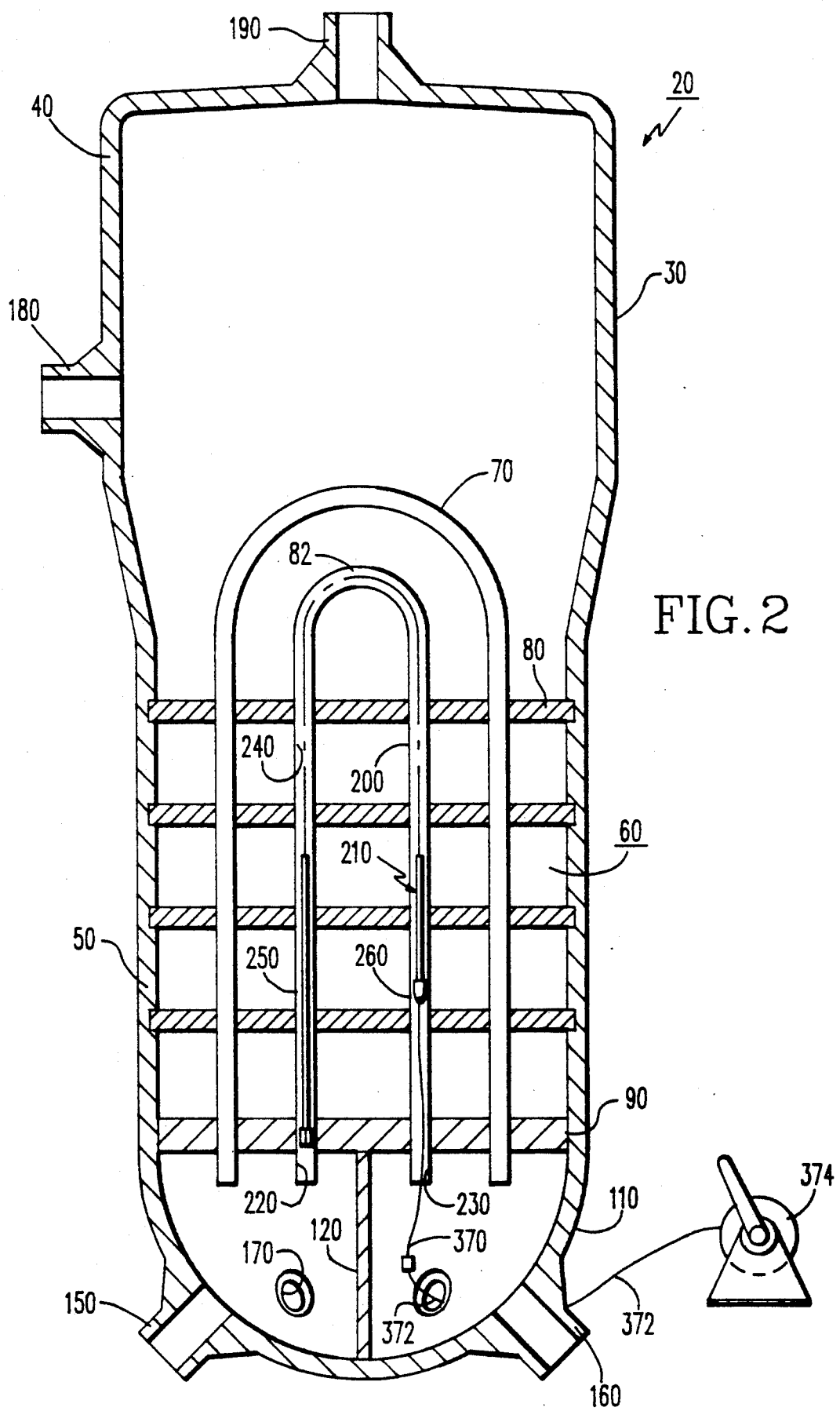
FIG. 2 is a schematic in vertical section of the steam generator with parts removed for clarity, one of the tubes having a tube dampener stiffener apparatus disposed therein.

Referring now to FIG. 2, steam generator 20 is there schematically shown having the plurality of tubes 70 (only two of which are shown) disposed therein. It will be appreciated that the plurality of tubes 70 will have U-bend regions 82 of varying radii and varying associated arc lengths. That is, the radii and arc lengths of U-bend region 82 for the outer rows of tubes 70 may be greater than the radii and arc lengths of region 82 for the inner rows of tubes 70, the radii and arc lengths of U-bend region 82 increasing from the inner-most to the outer-most rows of tubes 70. The outer rows of tubes 70 are defined as the rows of tubes 70 nearer inner hull 55 and the inner rows of tubes 70 are defined as the rows of tubes 70 farther away from hull 55. One of the tubes 70, for example a tube 200 belonging to an inner row of tubes and having a degraded portion (not shown), may have become degraded due to flow-induced vibration and/or stress corrosion cracking during operation of steam generator 20. As stated hereinabove, there is some risk that flow-induced vibration of degraded tube 200 during continued operation of steam generator 20 may propagate or accelerate the degradation and eventually cause degraded tube 200 to rupture or sever. Therefore, disposed in tube 200 is means for attenuating the flow-induced vibration of tube 200. As described in more detail hereinbelow, the attenuating means is a plurality of flexible cables, generally referred to as 210 (see FIG. 3) for simultaneously dampening the amplitude of vibration of and for increasing the stiffness of tube 200.

Referring to FIGS. 2, 3, 4, and 5, each U-shaped tube 70, including degraded tube 200, comprises a first open end 220, a second open end 230 and an inside surface 240. Moreover, each tube 70, including degraded tube 200, is defined by a straight first leg tube portion 250 and a straight second leg tube portion 260 substantially parallel to first leg tube portion 250. The U-bend tube portion 82 integrally interconnects first leg tube portion 250 and second leg tube portion 260. Disposed in degraded tube 200 is the plurality of generally cylindrical flexible cables 210 for absorbing and then dissipating the vibration energy of tube 200 as tube 200 vibrates. Cables 210 are flexible not only for attenuating the vibration of tube 200, but cables 210 are also flexible for flexibly navigating a relatively small radius of U-bend region 82 of tube 200 as cables 210 are slidably inserted into tube 200. The plurality of flexible cables 210 has a first end portion 280 and a second end portion 290. Each cable 210 in turn comprises a plurality of braided or helically intertwining flexible strands 300 for dampening the amplitude of vibration of tube 200 as tube 200 vibrates. Each strand 300 may be a metal wire which may be stainless steel for resisting corrosion when disposed in the high temperature/high pressure environment of steam generator 20. The intertwining or helical configuration of strands 300 define a friction interface planes 302 at the interface of adjacent strands 300. Adjacent strands 300 will slidably contact or rub together at friction interface plane 302 as cables 210 flex due to the vibration of tube 200. Moreover, adjacent cables 210 will impact and rub against each other as tube 200 vibrates. The rubbing together of strands 300 and the rubbing together of cables 210 as tube 200 vibrates absorbs and then dissipates the energy of vibration of tube 200. That is, the energy of vibration of tube 200 will be transferred to strands 300 and cables 210 causing friction between adjacent strands 300 and adjacent cables 210, which friction will generate radiative heat that will be released in tube 200. Thus, the vibration energy of tube 200 will be transformed into heat energy which will be radiated or dissipated into tube 200 for dampening the vibration of tube 200. Moreover, it will be understood that the plurality of cables 210 will attenuate or dampen a larger vibration amplitude than would otherwise be attenuated by a single cable.

Still referring to FIGS. 2, 3, 4, and 5, a rigid cable tip member 310 encloses first end portion 280 of the plurality of cables 210 and is attached to first end portion 280 for binding the first end portion 280 of the plurality of cables 210 together and for protecting inside surface 240 from fretting wear that might otherwise be cause by vibration of first end portion 280 against inside surface 240. Cable tip member 310 thus separates first end portion 280 from inside surface 240. Moreover, cable tip member 310 will tend to stiffen tube 200 because cable tip member 310 is rigid (.i.e., non-flexible). Cable tip member 310, which may be stainless steel for resisting corrosion in the high temperature/high pressure environment of steam generator 20, comprises a generally cylindrical first body portion 320 having a plurality of cylindrically-shaped recesses 330 therein for receiving the plurality of generally cylindrical cables 210, each recess 330 being sized to matingly receive its associated cable 210. Each cable 210 is affixed, such as by swaging or preferably brazing, in its associated recess 330 that belongs to cable tip member 310. Integrally attached to first body portion 320 is a second body portion 340, which may be generally frustoconical in shape. Integrally attached to second body portion 340 is a tapered third body portion 350. It will be appreciated that the frustoconical shape of second body portion 340 and the tapered shape of third portion 350 allow cable tip member 310 and thus first end portion 280 of the plurality of cables 210 to be easily registered into and easily slidably inserted through open first end 220 or open second end 230 of tube 200. Third body portion 350 has a hole 360 therethrough for receiving a towline 370 used for pulling the plurality of cables 210 into tube 200. Towline 370 is capable of being quickly disconnected from hole 360 after the plurality of cables 210 are pulled a sufficient distance into tube 200. Thus, it will be understood that cable tip member 310 serves at least five functions. First, cable tip member 310 binds first end portion 280 of the plurality of cables 210 together. Secondly, cable tip member 310 separates first end portion 280 from inside surface 240 to avoid fretting wear of inside surface 240 by first end portion 280. Thirdly, the shape of cable tip member 310 allows cable tip member 310 and thus first end portion 280 to be easily registered into and easily slidably inserted through open first end 220 or open second end 230 of tube 200. Fourthly, the tapered shape of cable tip member 310 allows the plurality of cables 210 to be easily slidably pulled into first leg tube portion 250, across U-bend tube portion 82 and into second leg tube portion 260. In addition, the hole 360 formed in cable tip member 310 allows for quick and reliable disconnection of towline 370 from cable tip member 310.

Returning to FIG. 2, connected to towline 370 may be a cord 372 which in turn may be connected to a take-up reel 374 for pulling the plurality of cables 210 a predetermined distance into tube 200 by suitable rotation of take-up reel 374. Cord 372 has a first terminal portion 375 connected to cord 372 and a second terminal portion 377 connected to take-up reel 374.

Figure 3:
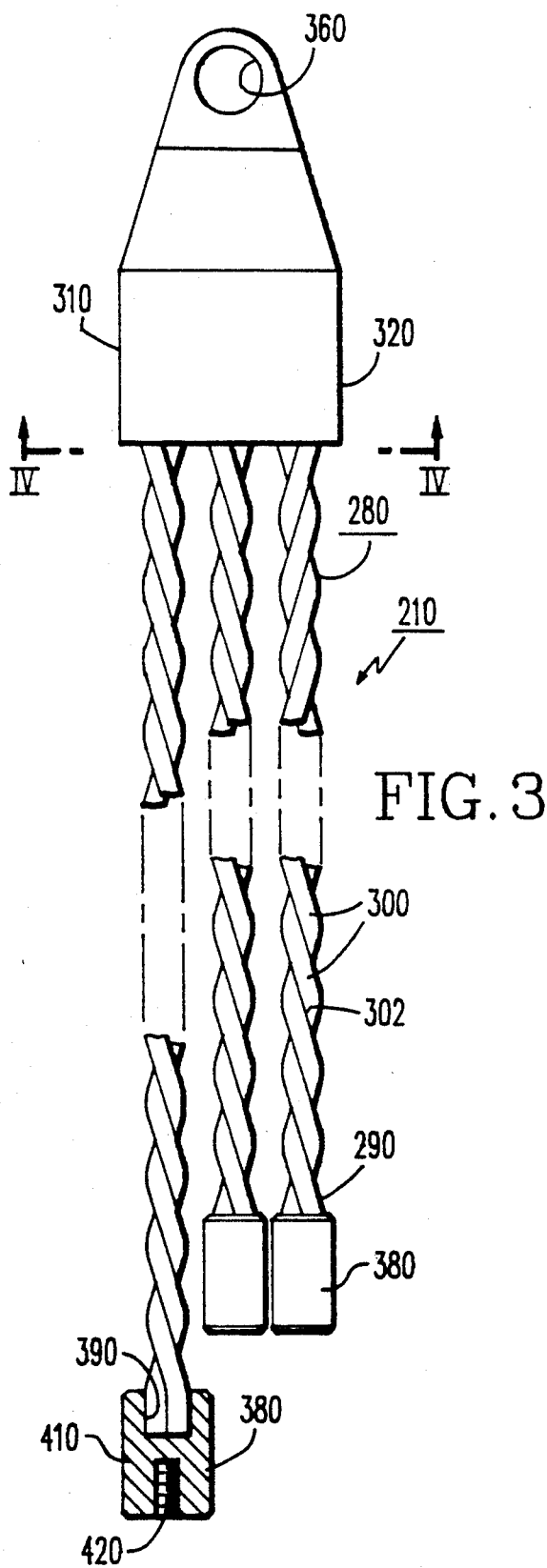
FIG. 3 illustrates the tube dampener and stiffener apparatus, comprising a plurality of flexible cables.
Figure 5:
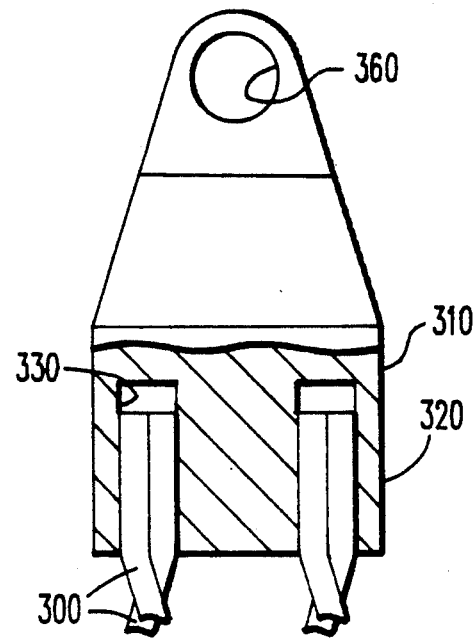
FIG. 5 illustrates in vertical section a cable tip member connected to the plurality of flexible cables.
Figure 4:
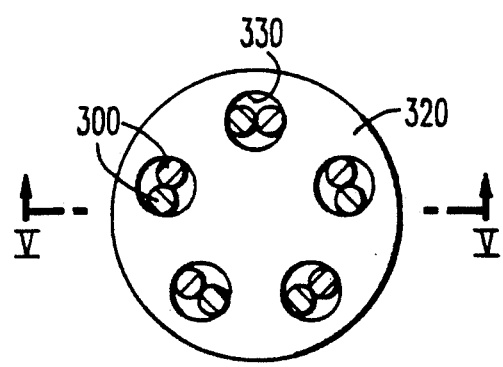
FIG. 4 is a section along line IV—IV of FIG. 3.

Referring to FIGS. 3, 4, and 5, enclosing second end portion 290 of each cable 210 is a rigid cable end fitting 380 having a bore 390 therein for receiving the associated second end portion 290. Each second end portion 290 of cable 210 is affixed, such as by swaging or preferably brazing, in its associated bore 390 formed in each cable end fitting 380. Each cable end fitting 380, which encloses second end portion 290, thus surrounds or encloses strands 300 for binding strands 300 together (i.e., to prevent stands 300 from unraveling) and for protecting inside surface 240 from fretting wear by vibration of strands 300 against inside surface 240. Cable end fitting 380 thus separates strands 300 from inside surface 240 at the location where strands 300 are enclosed by cable end fitting 380.

As best seen in FIG. 3, at least one of the cables 210, such as main cable 400, is longer than the other cables 210 for reducing the risk that all of the cables 210 will become entangled in the event cables 210 are removed from tube 200. Moreover, associated with main cable 400 is one of the cable end fittings 380, such as main cable end fitting 410, which is of a size or diameter larger than the other cable end fittings 380. Formed in main cable end fitting 410 is a screw-threaded bore 420 for threadably receiving a threaded installation tool (not shown) for pushing the plurality of cables 210 a predetermined distance into tube 200 as take-up reel 374 pulls the plurality of cables 210 into tube 200. Main cable end fitting 410 serves at least three functions. First, cable end fitting 410 provides a wear interface or wear surface between cable end fitting 410 and a mechanical plug 430 (see FIGS. 6 and 7). Secondly, as shown in FIG. 3, cable end fitting 410 provides bore 420 for receiving the threaded installation tool for pushing cables 210 into tube 200. Thirdly, cable end fitting 410 provides bore 420 for receiving a tool (not shown) to remove or pull cables 210 from tube 200.

Figure 6:
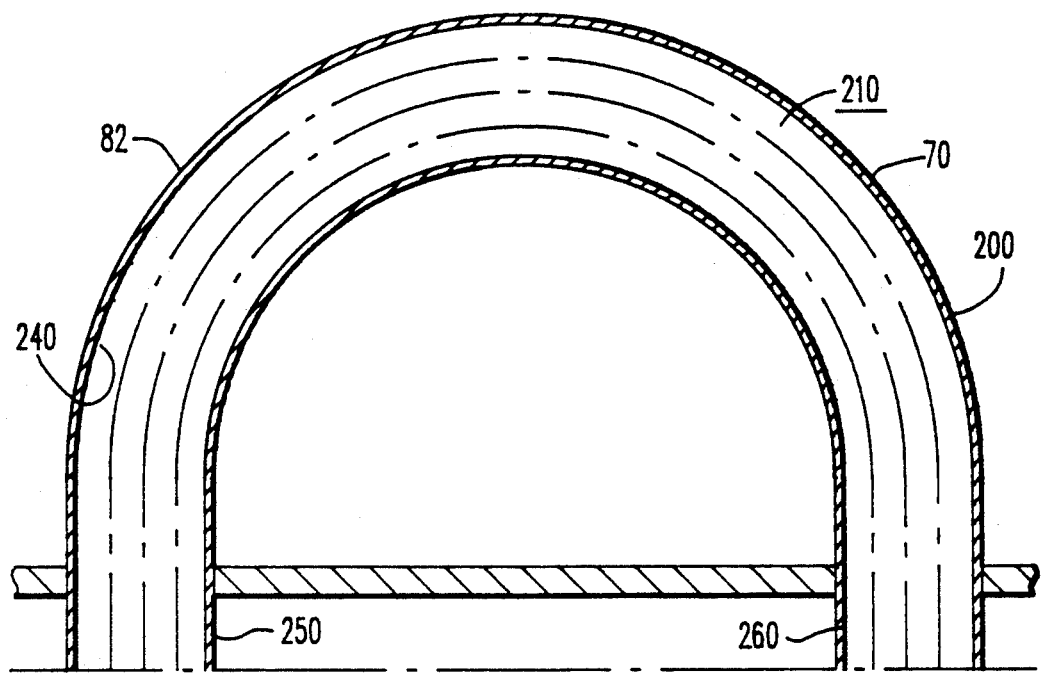
FIG. 6 shows in vertical section a steam generator tube having the plurality of flexible cables disposed therein.
Figure 6:
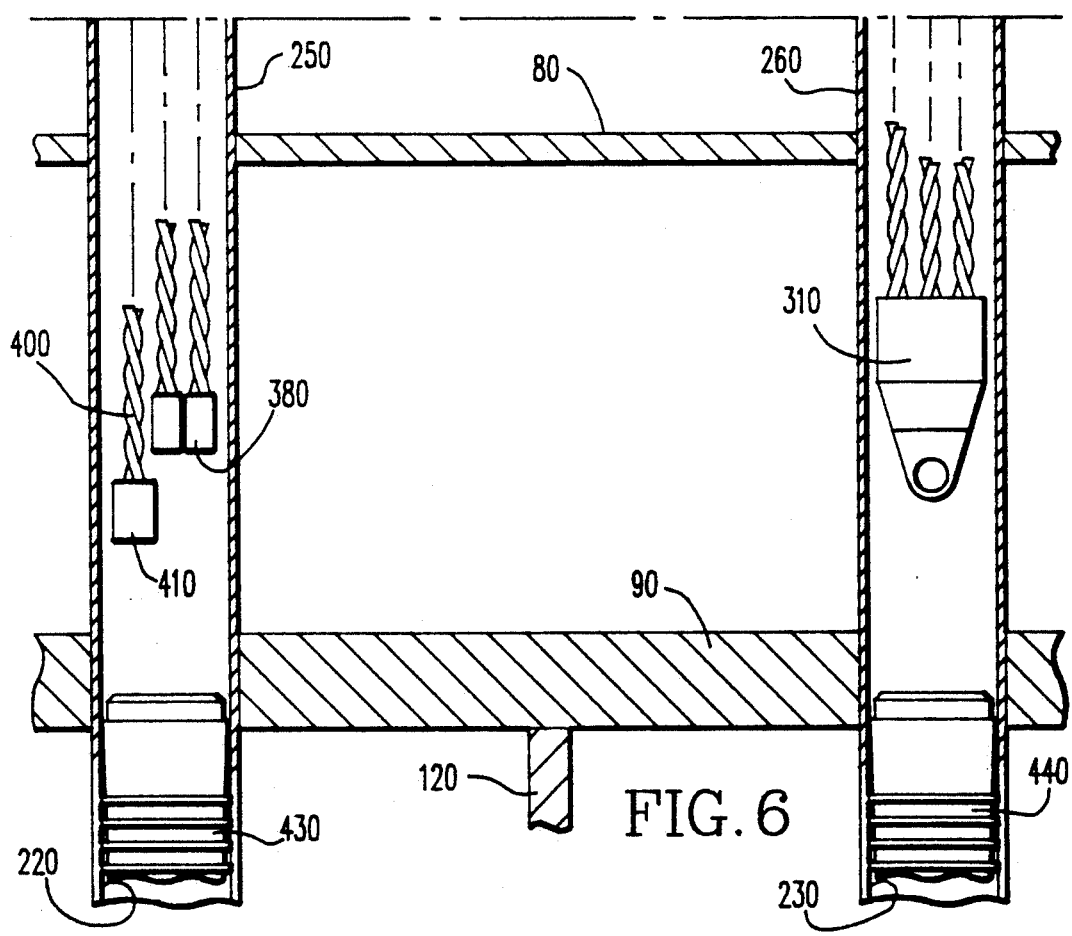

Referring now to FIG. 6, there is shown the plurality of cables 210 installed in degraded tube 200 for reducing the relatively large vibration amplitude of tube 200 as tube 200 vibrates and for stiffening tube 200. The plurality of cables 210 extend from first leg tube portion 250 through U-bend tube portion 82 and to a predetermined distance in second leg tube portion 260. Therefore, when installed, cable tip member 310 will be disposed in second leg tube portion 260 at a predetermined location and cable end fittings 380 will be disposed in first leg tube portion 260.

Figure 7:
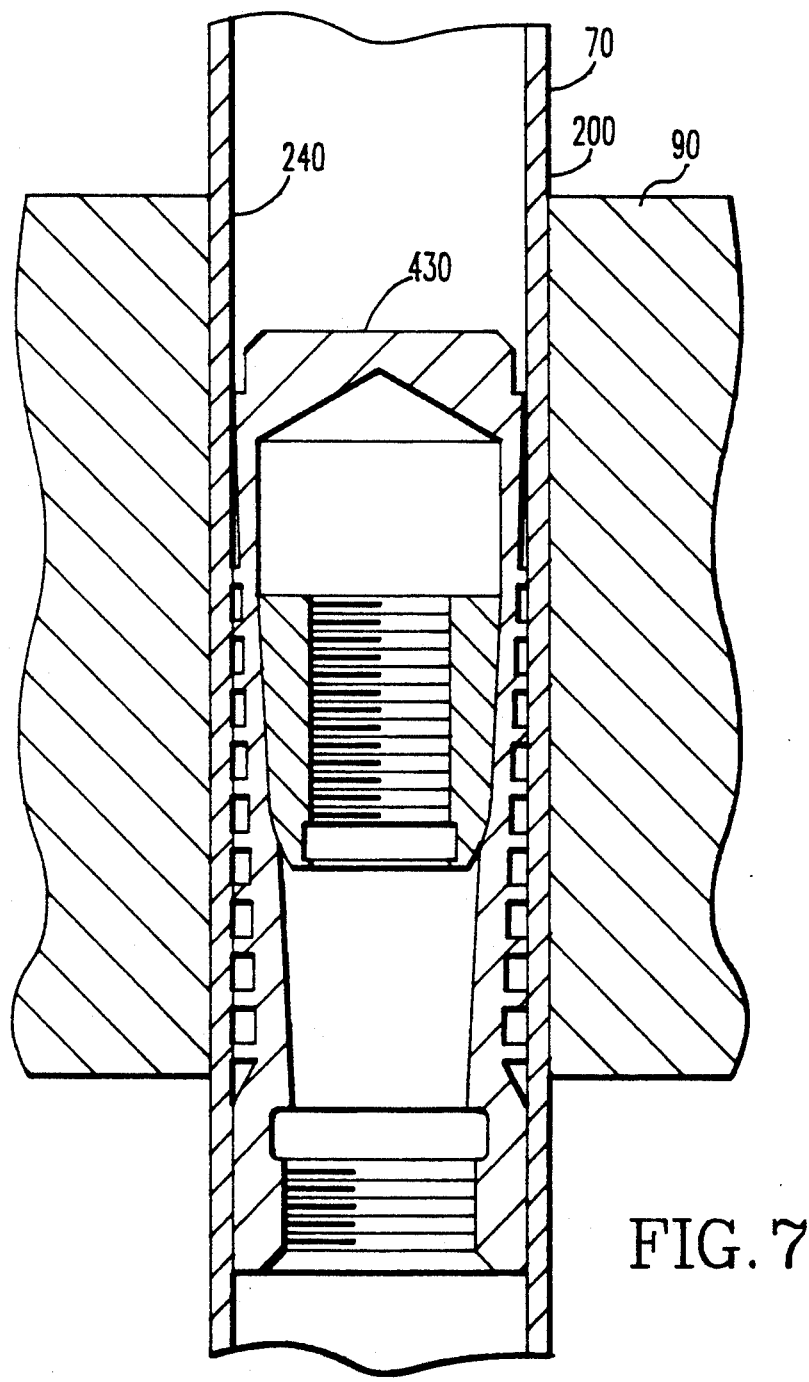
FIG. 7 is a vertical section of a mechanical plug disposed in an open end of the steam generator tube for sealing the ends of the tube after the plurality of flexible cables are disposed therein.

Referring to FIGS. 6 and 7, a seal means, such as a first mechanical tube plug 430, is disposed in first open end 220 of tube 200 and a second mechanical tube plug 440 is disposed in second open end 230 of tube 200 for sealing tube 200 against intrusion of primary fluid after cables 210 are installed. First tube plug 430 and second tube plug 440 may be of the type disclosed by U.S. Pat. No. 4,390,042 issued Jun. 28, 1983 in the name of Harvey D. Kucherer et al. and entitled "Tube Plug" and assigned to the Westinghouse Electric Corporation, the disclosure of which is hereby incorporated by reference. Plugging degraded tube 200 after installation of cables 210 substantially reduces the risk that the radioactive primary fluid will enter degraded tube 200 and thereafter commingle with the non-radioactive secondary fluid.

Referring now to FIG. 8, there is shown another embodiment of the invention comprising a plurality of spaced-apart generally cylindrical rigid sleeves 450 distributed at predetermined locations along the plurality of cables 210 for stiffening tube 200 and for protecting inside surface 240 of tube 200 from fretting wear that might otherwise be caused by vibration of the plurality of cables 210 against inside surface 240. Thus, it will be appreciated that sleeves 450 separate the plurality of cables 210 from inside surface 240. The plurality of sleeves 450 may be stainless steel for resisting corrosion that may be caused by the high temperature/high pressure steam generator environment to which sleeves 450 will be exposed. Each sleeve 450 may have a plurality of generally cylindrical passages 460 extending longitudinally therethrough for passage of cables 210. Each cable 210 is affixed, such as by swaging or preferably brazing, in its associated passage 460 so that each sleeve 460 will be affixed at a predetermined location on its associated cable 210 for suitably stiffening tube 200.

Referring to FIG. 9, there is shown yet another embodiment of the invention wherein the plurality of cables 210 are a plurality of metal chains 470 for increasing the dampening and the stiffness of tube 200. It will be appreciated that chains 470 are capable of adding more stiffness to tube 200 than cables 210 because chains 470 are relatively less flexible than cables 210; however, chains 470 will also be capable of dampening large amplitude vibrations because the linked configuration of chains 470 renders chains 470 somewhat flexible (i.e, not completely rigid).

During installation of cables 210, cord 372 may be extended through second open end 230, through second leg tube portion 260, around U-bend tube portion 82, through first leg tube portion 250 and through first open end 220. Towline 370, which is releasably received in hole 360 of cable tip member 310, may be connected to cord 372. As stated hereinabove, towline 370 is capable of being quickly releasably connected to cable tip member 310. The insertion tool (not shown) is threadably engaged into screw-threaded bore 420 for reasons to be described presently. Take-up reel 374, which is connected to cord 372, is rotatably operated such that the plurality of cables 210 is pulled into tube 200 through first open end 220. Moreover, as take-up reel pulls cables 210, the insertion tool is operated to simultaneously push the plurality of cables 210 into tube 200. This simultaneous push and pull action allows for faster installation of cables 210 to reduce radiation exposure to operators of the invention who may be nearby. Preferably, cables 210 will be pulled into tube 200 such that cables 210 will extend through first leg tube portion 250, across U-bend tube portion 82 and to a predetermined distance in second leg tube portion 260.

Towline 370 is then quickly disconnected from hole 360 and pulled from tube 200 and steam generator 20 by rotatably operating take-up reel 374. Cables 210 will now rest on surface 240 of tube 200. First mechanical plug 430 and second mechanical plug 440 are inserted into open first end 220 and into open second end 230, respectively, and then expanded into sealing engagement with inside surface 240 for sealing tube 200 against intrusion of primary fluid during continued operation of steam generator 20.

When suitably installed in tube 200, flexible cables 210 will increase the dampening (i.e., decrease the amplitude of vibration) and the stiffness of tube 200 as tube 200 is subjected to flow-induced vibration. As tube 200 vibrates, the energy of vibration will be transferred to cables 210 thereby causing cables 210 to flex and to vibrate. The plurality of strands 300 will rub together at the multiplicity of friction interface planes 302 and will dissipate the transferred energy as heat due to the rubbing friction between adjacent strands 300. Moreover, as cables 210 flex and vibrate, adjacent cables 210 will impact and rub together and thus will dissipate the transferred energy as heat due to the rubbing friction between cables 210. Thus, the energy of vibration of tube 200 will be transferred to or be absorbed by cables 210 for decreasing the large amplitude vibration of tube 200. The multiplicity of friction interface planes 302 and the plurality of cables 210 coact to provide the large amplitude vibration damping. In addition, it will be understood that rigid members such as cable tip member 310 and cable end fittings 380 tend to stiffen tube 200.

Moreover, as described hereinabove, it will be appreciated that sleeves 450 belonging to another embodiment of the invention will tend to stiffen tube 200. In addition, as described hereinabove, it will be further appreciated that chains 470, belonging to yet another embodiment of the invention, will increase the damping and stiffness of tube 200.

By way of example only, steam generator 20 may be a typical pressurized water reactor steam generator, such as a Model 51 steam generator supplied by the Westinghouse Electric Corporation. The plurality of tubes in such a steam generator 20 may total approximately 3500 tubes having a pitch of approximately 1.06 inches. In such a steam generator, each tube 70 may have an inside diameter of approximately 0.775 inches and an outside diameter of approximately 0.875 inches and may be made of "INCONEL 600". First leg tube portion 250 and second leg tube portion 260 each obtains a length of approximately 300 inches and is supported along their lengths by six equally spaced support plates 80. Moreover, the plurality of tubes 70 have U-bend regions 82 of varying radii and associated arc lengths and may be supported by anti-vibration bars 85 located at U-bend region 82. It will be understood that the radii of U-bend region 82 for the outer rows of tubes 70 will be greater that the radii of U-bend region 82 for the inner rows of tubes 70, the radii and arc lengths of U-bend region 82 increasing from the innermost to the outermost rows of tubes 70. By way of example only, the U-bend tube portion 82 for tube 200 may obtain a radius of approximately 32 inches. Thus, such a tube 200 having the above dimensions and composition will have a natural frequency of approximately 90 hertz and a relatively large vibration amplitude of from approximately 0.3 inch, if tube 200 is slightly degraded to approximately 1.06 inches (i.e., approximate distance between adjacent tubes 70), if tube 200 is severed. Of course, it will be appreciated that the amplitude of vibration will depend on the location of tube 200 in the fluid flow field, the local velocity of the fluid flowing past tube 200 and the severity of degradation of tube 200.

In such a steam generator, the critical flow velocity at which fluidelastic instability will onset may be approximately 6 inches per second or 0.5 feet per second near tubesheet 90. However, the velocity of the secondary fluid flowing from annulus 56 to tube sheet 90 will obtain a velocity of approximately 15 feet per second near tubesheet 90. In addition, the velocity of the secondary fluid flowing across U-bend region 82 will obtain a velocity of approximately 25 feet per second. Moreover, the velocity of the primary fluid flowing through tube 200 will obtain a velocity of approximately 25 feet per second. Thus, it will be appreciated that tube 200 will undergo fluidelastic flow-induced vibration in addition to turbulent buffeting and vortex shedding.

By way of example only, each of the plurality of cables 210 comprising the invention may be approximately three sixteenths of an inch in diameter and may be 1×19 IWRC (Independent Wire Rope Cord) preformed Type 302 stainless steel having one strand with 19 stands wound around the one strand. Moreover, each cable 210, which may weigh approximately two pounds, may obtain a length of approximately 350 inches so that the plurality of cables 210 will extend through first leg tube portion 250, around U-bend tube portion 82 and slightly past the sixth (i.e., uppermost) support plate 80. It will be understood that the plurality of cables 210 add mass to tube 200 and will thus reduce the natural frequency of tube 200 to approximately 66 hertz and will cause tube 200 to obtain a relatively smaller vibration amplitude of from approximately 1.5 mils to approximately 3.0 mils. Thus, it will be understood that the vibration amplitude of tube 200 with cables 210 installed therein is smaller than the vibration amplitude of tube 210 without cables 210 installed therein. Of course, it will be appreciated that the attenuated vibration amplitude will depend on the location and orientation of tube 200 in the fluid flow field, the local velocity of the fluid flowing past tube 200 and the severity of degradation of tube 200.

Although the invention is illustrated and described herein in several embodiments, it is not intended that the invention as illustrated and described be limited to the details shown, since various modifications may be obtained with respect to the invention without departing from the spirit of the invention or the scope of equivalents thereof.

Therefore, this invention provides a tube vibration dampener and stiffener apparatus and method for increasing the dampening and the stiffness of a tube subjected to large amplitude flow-induced vibration.

We claim:

1. An apparatus for attenuating vibration of a U-tube tubular member which is subject to vibrational forces during operation, the tubular member having at least one open end, comprising:
   (a) a tube sheet having an opening therethrough;
   (b) at least one U shaped tube having an open end positioned in the opening in said tube sheet;
   (c) attenuating means disposed inside said U shaped tube for absorbing and dissipating vibration creating energy to minimize vibration of said U-shaped tube; said attenuating means includes a plurality of cables which are essentially coextensive, each cable having one end thereof terminating adjacent the end of the other cables; at least a portion of said attenuating means disposed in the U-shaped portion of the U shaped tube; and
   (d) a unitary cable tip member attached to said one end of each said cables for binding said cables together; and said cables having the other ends thereof free to move independently of each other.

2. The apparatus as in claim 1 wherein the tubular member includes two open ends.

3. The apparatus as in claim 2 wherein the two open ends of the U-tube are plugged.

4. The apparatus as in claim 1 wherein said attenuating means includes a plurality of braided cables.

5. The apparatus as in claim 4 wherein the plurality of cables includes cable end fittings for binding the braided other ends of each cable, respectively.

6. The apparatus as in claim 5 wherein the cable end fittings include screw-threaded bores for threadably receiving a threaded tool for pushing said attenuating means into said U-shaped tube.

7. The apparatus as in claim 5 wherein at least one of the plurality of cables is of a different length.

8. The apparatus as in claim 1 wherein said attenuating means includes a plurality of chain link cables.

* * * * *